United States Patent
Joshi et al.

(10) Patent No.: US 11,807,391 B2
(45) Date of Patent: Nov. 7, 2023

(54) RETRACTABLE LIGHTING SYSTEMS AND AUTORETRACTION METHODS

(71) Applicant: HONEYWELL INTERNATIONAL INC., Charlotte, NC (US)

(72) Inventors: Vivek Ashok Joshi, Bangalore (IN); Abhijit Kulkarni, Bangalore (IN); Craig Giffen, Urbana, OH (US); Gokul Murugesan, Bangalore (IN); Sunit Kumar Saxena, Urbana, OH (US); William Tyson, III, Urbana, OH (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 288 days.

(21) Appl. No.: 17/381,225

(22) Filed: Jul. 21, 2021

(65) Prior Publication Data

US 2022/0380062 A1   Dec. 1, 2022

(30) Foreign Application Priority Data

May 31, 2021   (IN) .............................. 202111024152

(51) Int. Cl.
*B64D 47/02* (2006.01)
*B60Q 1/26* (2006.01)

(52) U.S. Cl.
CPC ........... *B64D 47/02* (2013.01); *B60Q 1/2692* (2013.01)

(58) Field of Classification Search
CPC ........ B64D 47/02; B64D 47/04; B64D 47/06; B60Q 1/05; B60Q 1/2692
See application file for complete search history.

(56) References Cited

U.S. PATENT DOCUMENTS

| | | | |
|---|---|---|---|
| 10,670,249 B1* | 6/2020 | Brahmbhatt | B60Q 1/0483 |
| 2003/0086251 A1* | 5/2003 | Hamilton | B64D 47/08 |
| | | | 362/12 |
| 2003/0107899 A1* | 6/2003 | Barnhart | B64D 47/04 |
| | | | 362/427 |
| 2009/0213605 A1* | 8/2009 | Wilkerson, III | B60Q 1/2657 |
| | | | 362/500 |
| 2009/0231430 A1* | 9/2009 | Buschmann | B60Q 1/0023 |
| | | | 348/148 |

(Continued)

FOREIGN PATENT DOCUMENTS

| AU | 2011100745 A4 | 8/2011 |
|---|---|---|
| CN | 211685660 U | 10/2020 |

OTHER PUBLICATIONS

Spaes, "Airbus BK117 Search and Landing Light", Av Foil News, Oct. 4, 2019, https://www.avfoil.com/vertical-magazine-news/spaes-receives-stc-for-airbus-bk117-search-and-landing-light/.

*Primary Examiner* — Alexander K Garlen
(74) *Attorney, Agent, or Firm* — LORENZ & KOPF, LLP

(57) ABSTRACT

Methods and systems are provided for autonomously operating a retractable lighting arrangement. One method involves obtaining a current speed of the vehicle when the lighting arrangement is in an extended state, and when the current speed is greater than a threshold when the lighting arrangement is in the extended state, verifying one or more illumination elements associated with the lighting arrangement are in a deactivated state and thereafter automatically signaling an actuation arrangement associated with the lighting arrangement to transition the lighting arrangement from the extended state to a retracted state.

20 Claims, 2 Drawing Sheets

(56) References Cited

U.S. PATENT DOCUMENTS

| | | | |
|---|---|---|---|
| 2011/0188257 A1* | 8/2011 | Sidler | G09F 21/10 |
| | | | 362/470 |
| 2014/0078306 A1* | 3/2014 | Miyoshi | B60Q 1/48 |
| | | | 348/148 |
| 2017/0203855 A1* | 7/2017 | Leclear | B64D 47/06 |
| 2017/0355470 A1* | 12/2017 | Keller | F21S 41/657 |
| 2019/0185181 A1* | 6/2019 | Sure | F21V 7/0083 |
| 2020/0217688 A1 | 7/2020 | Khan et al. | |
| 2020/0346612 A1* | 11/2020 | Scaife | B60Q 1/2657 |
| 2021/0245655 A1* | 8/2021 | Giffen | F21S 41/657 |

* cited by examiner

RETRACTABLE LIGHTING SYSTEMS AND AUTORETRACTION METHODS

CROSS REFERENCE TO RELATED APPLICATION

This application claims priority to Indian Provisional Patent Application No. 202111024152, filed May 31, 2021, the entire content of which is incorporated by reference herein.

TECHNICAL FIELD

The subject matter described herein relates generally to vehicle systems, and more particularly, embodiments of the subject matter relate to retractable lighting systems for aircraft and other vehicles.

BACKGROUND

Aircraft and other vehicles often include a retractable lighting system that allows for a lighting arrangement to be stowed or retracted for improved aerodynamic performance and maneuverability. While the lighting arrangement may be designed to support higher speed operation, the increased environmental or operational stress due to maintaining the lighting arrangement extended at higher speeds may impact usable life of the lighting arrangement (or components thereof) while also reducing vehicle fuel efficiency and increasing the probability of physical damage due to an external foreign object. However, manually managing the lighting arrangement may increase operator workload and add to the complexity of operating the vehicle, potentially detracting situational awareness. Accordingly, it is desirable to improve operation of a retractable lighting system in a manner that does not unduly interfere with a pilot's (or other vehicle operator's) usage of the lighting arrangement or other operation of the aircraft (or vehicle). Other desirable features and characteristics will become apparent from the subsequent detailed description and the appended claims, taken in conjunction with the accompanying drawings and this background.

BRIEF SUMMARY

Methods and systems are provided for autonomously operating a retractable lighting arrangement associated with a vehicle, such as a helicopter or other aircraft. One method involves obtaining a current speed of the vehicle when the lighting arrangement is in an extended state and when the current speed is greater than a threshold when the lighting arrangement is in the extended state, verifying one or more illumination elements associated with the lighting arrangement are in a deactivated state and automatically signaling an actuation arrangement associated with the lighting arrangement to transition the lighting arrangement from the extended state to a retracted state after verifying the one or more illumination elements are in the deactivated state.

In another embodiment, a lighting system is provided that includes a retractable lighting arrangement including one or more illumination elements, an actuation arrangement coupled to the retractable lighting arrangement, and a control system coupled to the actuation arrangement and the retractable lighting arrangement. The control system is configured to identify when a current vehicle speed is greater than a retraction threshold speed when the retractable lighting arrangement is in an extended state and thereafter verify the one or more illumination elements associated with the retractable lighting arrangement are in a deactivated state prior to automatically signaling the actuation arrangement to transition the retractable lighting arrangement from the extended state to a retracted state.

In another embodiment, an apparatus is provided for a computer-readable medium having computer-executable instructions stored thereon that, when executed by a processing system, cause the processing system to obtain a current speed of a vehicle when a lighting arrangement is in an extended state and when the current speed is greater than a threshold when the lighting arrangement is in the extended state, verify one or more illumination elements associated with the lighting arrangement are in a deactivated state and automatically signal an actuation arrangement associated with the lighting arrangement to transition the lighting arrangement from the extended state to a retracted state after verifying the one or more illumination elements are in the deactivated state.

This summary is provided to describe select concepts in a simplified form that are further described in the detailed description. This summary is not intended to identify key or essential features of the claimed subject matter, nor is it intended to be used as an aid in determining the scope of the claimed subject matter.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Figure 1:
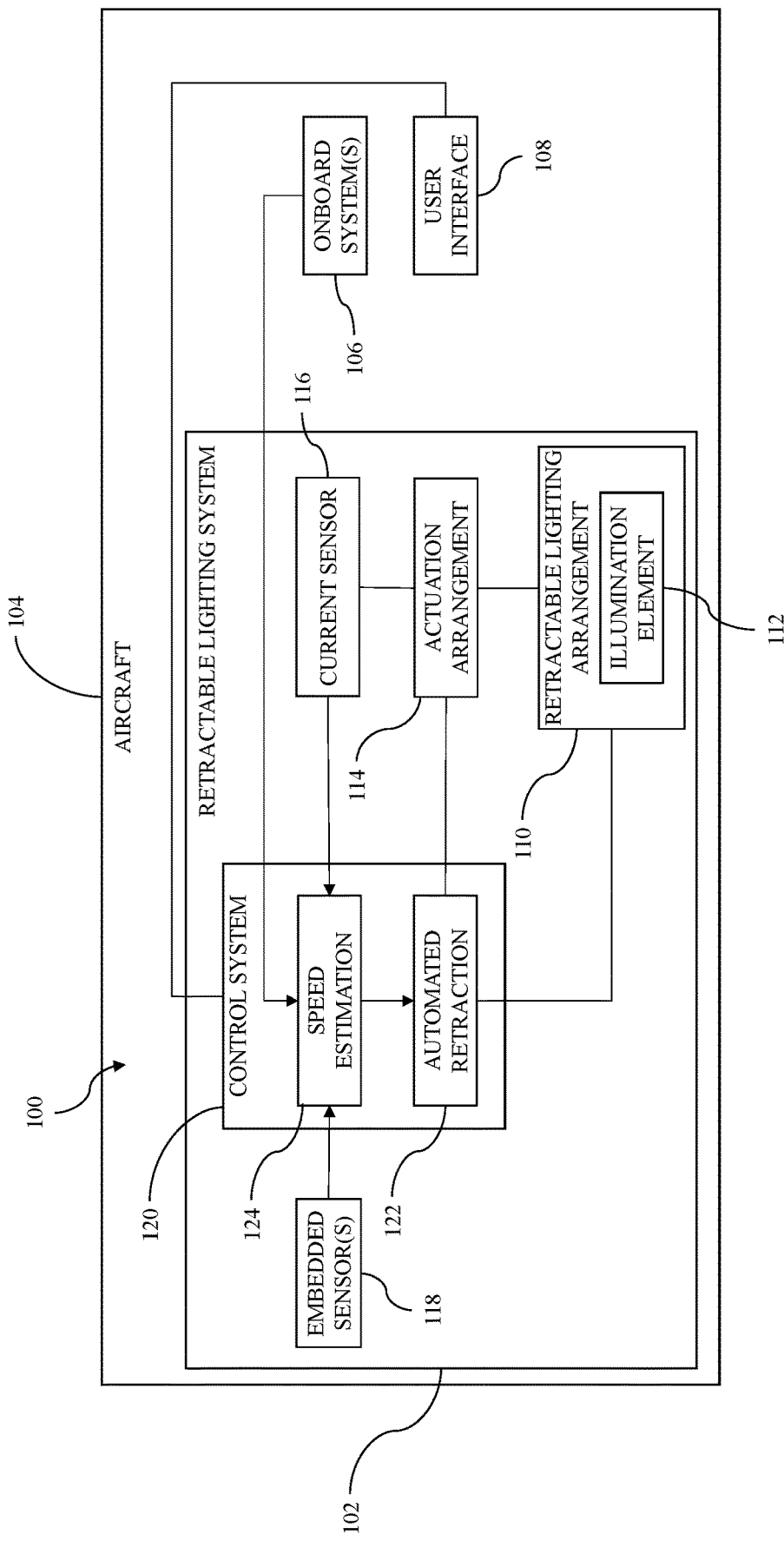
FIG. 1 is a block diagram of a vehicle system including a retractable lighting system in an exemplary embodiment.

Embodiments of the subject matter described herein generally relate to systems and methods that facilitate a pilot or other vehicle operator utilizing a retractable lighting system by providing an autonomous operating mode for the retractable lighting system that automatically retracts and/or deactivates the retractable lighting system based on the current operating status of the vehicle and the retractable lighting arrangement. For example, some vehicles may include multiple control switches for separately extending and/or retracting a lighting arrangement as well as activating and/or deactivating illumination elements of the lighting arrangement independently of one another. This may result in a scenario where the lighting arrangement is extended with the illumination element deactivated, thereby creating drag and subjecting the lighting arrangement to physical or environmental stress. An alternative scenario is also possible, where the lighting arrangement is retracted but the illumination element is activated, which subjects the lighting arrangement to increased thermal stress and may unintentionally discharge energy (e.g., from a battery). Accordingly, the autonomous lighting control processes described herein monitor the operating state of the lighting arrangement and the current vehicle operating state to autonomously retract and/or deactivate the lighting arrangement to improve the reliability, efficiency and longevity of the retractable lighting system.

For purposes of explanation, the subject matter is primarily described herein in the context of an aircraft; however, the subject matter described herein is not necessarily limited to aircraft or avionic environments, and in alternative embodiments, may be implemented in an equivalent manner for ground operations, marine operations, or otherwise in the context of other types of vehicles and travel spaces. For example, an aircraft, such as a helicopter, an unmanned aerial vehicle (UAV), an urban air mobility vehicle (UAM), or the like, may include a retractable lighting system for purposes of selectively illuminating a region or area of the ground beneath the aircraft, such as, for example, a searchlight (e.g., for search and rescue operations), a landing light (e.g., to illuminate a landing pad), or the like. Accordingly, the autonomous lighting control processes described herein monitor the operating state of the lighting arrangement (e.g., whether the lighting arrangement is extended, whether the lighting arrangement is illuminated, etc.) with respect to the current aircraft speed to automatically and autonomously retract the lighting arrangement when the current aircraft speed indicates that the lighting arrangement does not need to be extended (e.g., when it is unlikely that the pilot is performing a search and rescue operation or attempting to land the aircraft) or should not be extended (e.g., to reduce drag and physical stress on the lighting arrangement). Additionally, the autonomous lighting control processes described herein automatically and autonomously deactivate or turn off illumination elements associated with the lighting arrangement when the lighting arrangement is retracted or stowed in order to reduce thermal stress and energy consumption. By automatically and autonomously operating the retractable lighting system, the pilot is alleviated of the burden of manually managing the retractable lighting system, thereby reducing pilot workload and improving situational awareness by allowing the pilot to devote time and attention to other operational tasks.

FIG. 1 depicts an exemplary embodiment of a system 100 that includes a retractable lighting system 102 that maybe utilized with a vehicle, such as an aircraft 104. In the illustrated implementation, the retractable lighting system 102 is coupled to one or more onboard systems 106 and one or more user interface devices 108 onboard the aircraft 104, and the retractable lighting system 102 is configurable to support an autonomous mode for automatically retracting a retractable lighting arrangement 110 and performing the related tasks, functions, operations and/or processes described herein.

The user interface device(s) 108 generally represent the user input devices configured to allow a user (e.g., a pilot, co-pilot, or crew member) to interact with the retractable lighting system 102, such as, for example, a joystick, knob, switch, or the like. For example, when the aircraft 104 is a helicopter, the user interface device(s) 108 may be realized as one or more switches on a collective lever or a cyclic stick inside the helicopter cockpit. That said, it should be appreciated the subject matter described herein is not limited to any particular type of user interface device(s) 108 and may be implemented using any sort of user input device, including, but not limited to, a keypad, touchpad, keyboard, mouse, touch panel (or touchscreen), line select key or another suitable device adapted to receive input from a user. For example, in some embodiments, the user interface device 108 may be realized as an audio input device, such as a microphone, audio transducer, audio sensor, or the like, that is adapted to allow a user to provide audio input to the aircraft system 100 in a "hands free" manner.

The one or more onboard systems 106 generally represent the avionic systems onboard the aircraft 104 or other systems associated with the aircraft 104 that are configured to support navigation, flight planning, and other aircraft control functions in a conventional manner, as well as to provide real-time data and/or information regarding the operational status of the aircraft 104. For example, in practice, an aircraft system 100 and/or aircraft 104 will likely include numerous avionics systems for obtaining and/or providing real-time flight-related information, such as a navigation system, a global positioning system (GPS), an inertial reference system (IRS), a radio-based navigation system (e.g., VHF omni-directional radio range (VOR) or long range aid to navigation (LORAN)), a flight management system, and/or the like. In this regard, the subject matter described herein is not limited to any particular number, type, or combination of avionics systems or other onboard systems that may be located onboard the aircraft 104 and configured to support the subject matter described herein.

The retractable lighting system 102 includes a retractable lighting arrangement 110 that includes one or more illumination elements 112 and is mounted on or otherwise integrated with an exterior surface of the body of the aircraft 104 in a manner that allows the lighting arrangement 110 to selectively extend away from that exterior surface or otherwise relative to the body of the aircraft 104 to illuminate terrain or other objects at a desired spatial orientation relative to the body of the aircraft 104. For example, the retractable lighting arrangement 110 could be configured as a searchlight or a landing light that is forward mounted or forward fit on the underside of the aircraft 104 to illuminate terrain or objects ahead of or beneath the aircraft 104. In this regard, for a searchlight configuration, the lighting arrangement 110 may be configured to allow the beam of light emitted from its illumination element(s) to be swiveled or otherwise reoriented while in an extended state. In the retracted state, the retractable lighting arrangement 110 may be configured to conform with the external surface of the body of the aircraft 104 to provide an aerodynamic surface that reduces drag or airflow disturbances relative to the extended state. The illumination element(s) 112 may be realized as any sort of light source or source of electromagnetic radiation capable of emitting a directional beam of electromagnetic radiation having wavelengths within the frequency spectrum of visible light or infrared light, such as, for example, one or more laser diodes, light-emitting diodes (LEDs), halogen lamps, or the like.

Still referring to FIG. 1, in exemplary embodiments, the lighting system 102 includes an actuation arrangement 114, such as a motor, that is physically coupled to the retractable lighting arrangement or otherwise configured to control the physical position of the lighting arrangement 110 between the extended and retracted states. For example, lighting system 102 may include an electric motor 114 that is capable of countering drag or other aerodynamic or physical forces exerted on the lighting arrangement 110 to maintain the lighting arrangement 110 in an extended state when a switch or other user interface 108 associated with the lighting system 102 is set to a state or position corresponding to extension of the lighting arrangement 110. Conversely, when the switch or other user interface 108 associated with the lighting system 102 is reverted to a state or position corresponding to retraction of the lighting arrangement 110, the motor 114 may be operated to retract the lighting arrangement 110 to the retracted state. In this regard, the switch or user interface 108 that is configured to enable manual control of the motor 114 to retract or extend the lighting arrangement 110 may be different from another switch or user interface 108 that is configured to enable manual control of the illumination element(s) 112 to activate or deactivate the illumination element(s) 112.

The control system 120 generally represents the hardware, circuitry, processing logic, and/or other components configured to facilitate automated operation of the retractable lighting arrangement 110 and perform additional processes, tasks and/or functions to support operation of the aircraft system 100, as described in greater detail below. Depending on the embodiment, the control system 120 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the control system 120 includes processing logic that may be configured to carry out the functions, techniques, and processing tasks associated with the operation of the aircraft system 100 described in greater detail below. Furthermore, the steps of a method or algorithm described in connection with the embodiments disclosed herein may be embodied directly in hardware, in firmware, in a software module executed by the control system 120, or in any practical combination thereof. In accordance with one or more embodiments, the control system 120 includes or otherwise accesses a data storage element, such as a memory (e.g., RAM memory, ROM memory, flash memory, registers, a hard disk, or the like) or another suitable non-transitory short or long term storage media capable of storing computer-executable programming instructions or other data for execution that, when read and executed by the control system 120, cause the control system 120 to execute and perform one or more of the processes, tasks, operations, and/or functions described herein.

In exemplary embodiments, computer-executable programming instructions are executed by the processor, control module, or other hardware associated with the control system 120 and cause the control system 120 to generate, execute, or otherwise implement an automated retraction application 122 that is configurable to automatically operate the motor 114 to retract the retractable lighting arrangement 110 based at least in part on the current speed of the aircraft 104. In this regard, in one or more embodiments, the computer-executable programming instructions are configurable to cause the control system 120 to generate, execute, or otherwise implement a speed estimation application 124 capable of identifying, estimating, or otherwise determining the current speed of the aircraft 104 based on the output of one or more components of the system 100 and output or otherwise provide an indication of the current speed of the aircraft 104 to the automated retraction application 122.

For example, in one or more embodiments, the speed estimation application 124 is coupled to a motor current sensing arrangement 116 (or motor current sensor) that is configured to measure electrical current flow to the motor 114, such as a Hall effect current sensor, a resistive current sensor or the like. In this regard, when the lighting arrangement 110 is extended, the lighting arrangement 110 is subjected to a drag force that is directly related to a square of the aircraft speed governed by the equation $$F_D = \frac{C_D}{2}\rho A V^2,$$

where $F_D$ represents the force due to drag (in Newtons), V represents the current aircraft speed or velocity (in meters per second), A is the area of the canopy of the lighting arrangement 110 subjected to drag (in meters squared), $\rho$ is the air density (in kilograms per meter cubed), and $C_D$ is a drag coefficient. The drag force imposes a reactionary torque on the motor 114 or other actuator as a product of the drag force and the length of the moment arm extending the lighting arrangement 110 from the body of the aircraft 104, which, in addition to increasing mechanical stress, requires electrical current to the motor 114 to increase in order to counteract drag and maintain the lighting arrangement 110 in the extended position (which also increases power loss in the motor windings and may impact reliability of electromechanical components). Accordingly, in some embodiments, based on the relationship between the speed of the aircraft 104 and the amount of electrical current required to produce sufficient torque by the motor 114 to maintain the lighting arrangement 110 in the extended state, the speed estimation application 124 calculates or otherwise determines an estimate of the current aircraft speed based on the current motor current measurement value output by the motor current sensor 116 using the torque constant of the motor 114. For example, the current motor current measurement value may be converted into an estimated torque measurement value using the torque constant of the motor 114, which, in turn may be utilized to estimate the drag force based on the length of the moment arm associated with the lighting arrangement 110. The estimated aircraft speed may be calculated from the estimated drag force based on the area of the canopy of the lighting arrangement 110 subjected to drag (A), the air density ($\rho$), and the drag coefficient ($C_D$) as set forth above.

Additionally, or alternatively, in one or more embodiments, the speed estimation application 124 is coupled to one or more sensing arrangements 118 that are integrated with or otherwise embedded into the retractable lighting system 102. For example, the retractable lighting system 102 may include a housing that is mounted or otherwise affixed to the body of the aircraft 104 and that is configured to stow or otherwise contain the retractable lighting arrangement 110 and provide an aerodynamic surface when the retractable lighting arrangement 110 is in the retracted state, with the one or more sensing arrangements 118 being mounted to, affixed to, or otherwise contained within the housing of the retractable lighting system 102. Examples of embedded sensors 118 that may be mounted within the housing or otherwise integrated into the lighting system 102 include a Global Navigation Satellite System (GNSS) or a Global Positioning System (GPS), an inertial measurement unit (IMU), an acceleration sensor, a pitot tube, and/or the like. In this regard, when an embedded sensor 118 outputs measurement data indicative of the current location of the aircraft 104 (e.g., GNSS, GPS, or the like), the speed estimation application 124 calculates or otherwise determines the current speed of the aircraft 104 based on the rate of change of the aircraft location over successive measurement samples. On the other hand, when an embedded sensor 118 outputs measurement data indicative of the current acceleration of the aircraft 104 (e.g., an IMU, an accelerometer, or the like), the speed estimation application 124 calculates or otherwise determines the current speed of the aircraft 104 by integrating the aircraft acceleration over successive measurement samples. In yet other embodiments, the embedded sensor 118 may be configured to output measurement data indicative of the current aircraft speed (e.g., a pitot tube), in which case, the speed estimation application 124 determines the current speed of the aircraft 104 directly based on the output measurement data.

It should be noted that the subject matter is not intended to be limited to any particular type, number, or configuration of sensors 116, 118 that may be embedded or otherwise integrated with the retractable lighting system 102. For example, in some embodiments, the speed estimation application 124 may be configured to augment or otherwise combine an estimate of the current aircraft speed derived from the motor current measurement data output by the motor current sensor 116 with one or more estimates of the current aircraft speed derived from one or more other embedded sensors 118 to arrive at an aggregated estimation of the current aircraft speed (e.g., by averaging the individual estimates of the current aircraft speed).

Still referring to FIG. 1, in yet other embodiments, the speed estimation application 124 may be coupled to one or more avionics systems 106 onboard the aircraft 104 to obtain the current aircraft speed or other measurements indicative of the current aircraft speed from the onboard avionics system(s) 106. For example, the onboard avionics system(s) 106 may include a navigation system, a FMS, a pitot tube, or another system that is capable of measuring or otherwise determining the current speed of the aircraft 104 and outputting the current aircraft speed to the retractable lighting system 102 (e.g., via an avionics bus). That said, in other embodiments, in a similar manner as described above in the context of the embedded sensor(s) 118, the onboard avionics system(s) 106 may provide measurement data indicative of the location and/or acceleration of the aircraft 104, which, in turn, may be utilized by the speed estimation application 124 to calculate or otherwise determine an estimate of the current aircraft speed.

It should be understood that FIG. 1 is a simplified representation of the aircraft system 100 for purposes of explanation and ease of description, and FIG. 1 is not intended to limit the application or scope of the subject matter described herein in any way. For example, although FIG. 1 shows the embedded sensor(s) 118 as being part of the retractable lighting system 102, in some embodiments, the embedded sensor(s) 118 may be implemented separately from the retractable lighting system 102. Furthermore, practical embodiments of the aircraft system 100 and/or aircraft 104 will include numerous other devices and components for providing additional functions and features, as will be appreciated in the art. Moreover, in some embodiments, features and/or functionality of control system 120 described herein can be implemented by or otherwise integrated with the features and/or functionality provided by an onboard avionic(s) system 106 that is communicatively coupled to the motor 114 and/or the lighting arrangement 110; that is, the control system 120, the automated retraction application 122 and/or the speed estimation application 124 may be a component of an onboard system 106.

Figure 2:
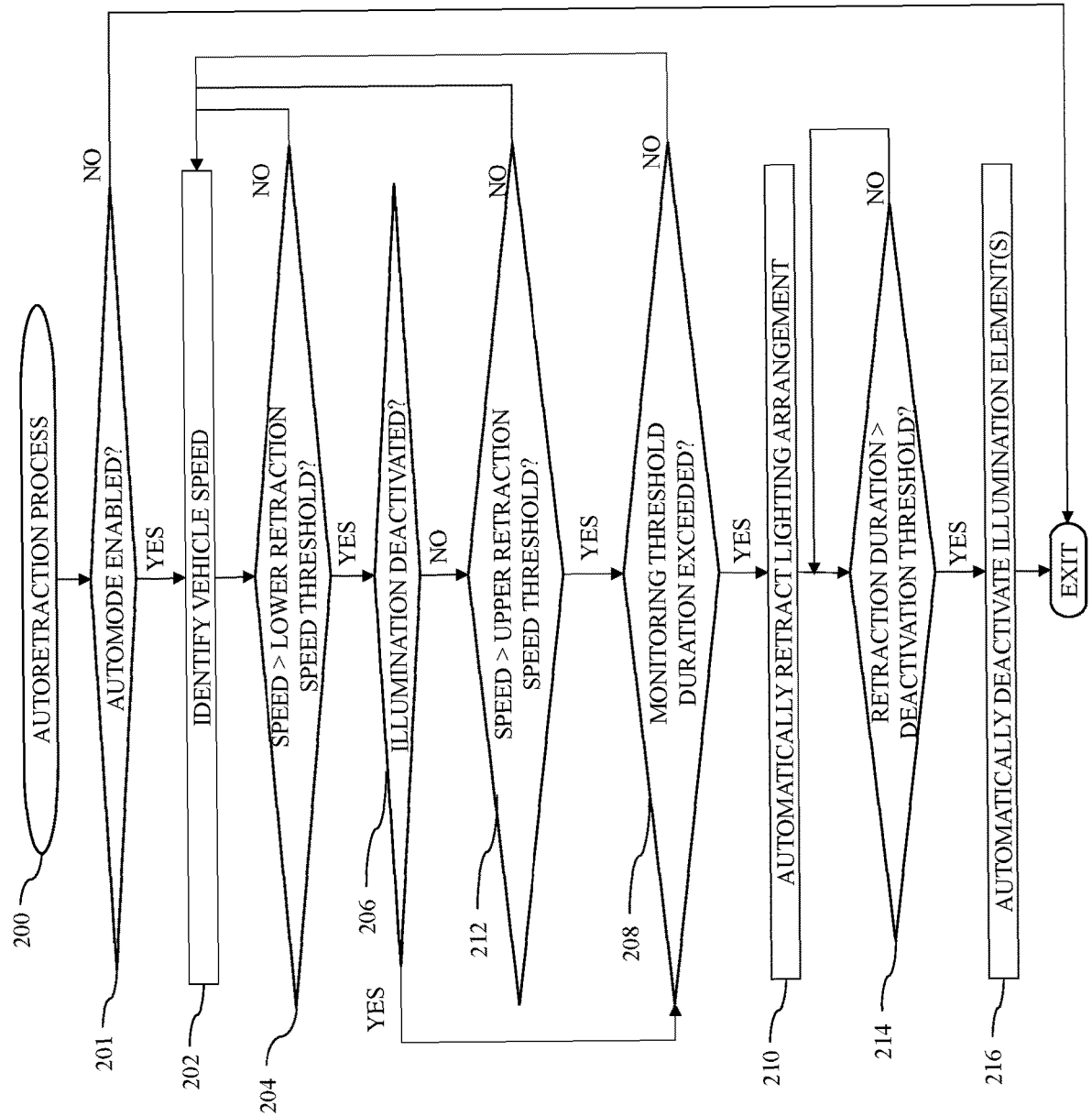
FIG. 2 is a flow diagram of an autoretraction process suitable for implementation in connection with the retractable lighting system in the vehicle system of FIG. 1 in one or more exemplary embodiments.

FIG. 2 depicts an exemplary embodiment of an autoretraction process 200 suitable for implementation by a retractable lighting system in an autonomous operating mode to automatically retract a retractable lighting arrangement based on the current operating state of the aircraft. The various tasks performed in connection with the illustrated process may be implemented using hardware, firmware, software executed by processing circuitry, or any combination thereof. In practice, portions of the autoretraction process 200 may be performed by different elements of the aircraft system 100. That said, for purposes of explanation, the autoretraction process 200 is described herein as primarily being performed by the control system 120, the automated retraction application 122 and/or the speed estimation application 124. It should be appreciated that practical embodiments of the autoretraction process 200 may include any number of additional or alternative tasks, and/or the autoretraction process 200 may be incorporated into a more comprehensive procedure or process having additional functionality not described in detail herein. Moreover, one or more of the tasks shown and described in the context of FIG. 2 could be omitted from a practical embodiment of autoretraction process 200 as long as the intended overall functionality remains intact.

Referring to FIG. 2, and with continued reference to FIG. 1, in one or more exemplary embodiments, the autoretraction process 200 initializes or otherwise begins once the retractable lighting arrangement has entered an extended state and an autonomous operating mode for operating the retractable lighting arrangement has been enabled (task 201). For example, in some embodiments, the control system 120 and/or the automated retraction application 122 is communicatively coupled to a position sensor associated with the rotor of the motor 114 (e.g., an encoder or the like) to receive measured rotor position data indicative of the physical position of the rotor, which, in turn corresponds to the position of the retractable lighting arrangement 110 and thereby indicates when the retractable lighting arrangement 110 is in the extended state. In other embodiments, the control system 120 and/or the automated retraction application 122 may be communicatively coupled to a position sensor associated with the retractable lighting arrangement 110 to receive measured position data for the retractable lighting arrangement 110 that identifies is in the extended state. In other embodiments, the control system 120 and/or the automated retraction application 122 may be communicatively coupled to one or more user interface devices 108 to identify the retractable lighting arrangement is in the extended state based on the state or configuration of one or more knobs, switches, or other user input elements. For example, the collective may include one input element associated with the physical state of the lighting arrangement 110 and another input element associated with the illumination state of the illumination element 112, from which the control system 120 and/or the automated retraction application 122 can derive the current state of the retractable lighting arrangement 110 based on the state or configuration of the collective input elements.

When the autonomous operating mode for the retractable lighting arrangements is enabled and the retractable lighting arrangement is in the extended state, the autoretraction process 200 monitors the current speed of the aircraft in real-time to automatically retract the lighting arrangement depending on the current aircraft speed and the operational state of the lighting arrangement. In this regard, the autoretraction process 200 obtains or otherwise identifies the current aircraft speed and determines whether the current aircraft speed exceeds a lower retraction threshold speed (tasks 202, 204). As described above, depending on the embodiment, the speed estimation application 124 may estimate or otherwise calculate the current aircraft speed based on measurement data from the motor current sensor 116 indicative of the electrical current to the motor 114 or based on measurement data from another sensor 118 or system 106 associated with the aircraft 104. For example, the speed estimation application 124 may estimate or otherwise calculate the current aircraft speed based on acceleration measurement data from an accelerometer, an IMU, and/or the like by integrating successive acceleration measurements, or alternatively, the speed estimation application 124 may estimate or otherwise calculate the current aircraft speed based on position or location measurement data from a GNSS, a GPS, and/or the like by determining the rate of change or derivative of successive location measurements. The lower retraction threshold speed represents an aircraft speed at which it is unlikely that the pilot or other aircraft operator is likely to be utilizing the retractable lighting arrangement 110 for identifying a desired target, landing location, and/or the like. In this regard, the lower retraction threshold speed value may be configurable by the pilot or another user to avoid undesirably retracting the lighting arrangement 110 while it is in use. For example, the pilot may designate a speed of 60 knots as the lower retraction threshold speed value, above which the pilot is unlikely to be performing a search and/or rescue operation, attempting to identify a landing location or other target, and/or the like. While the current aircraft speed is below the lower retraction threshold speed value, the control system 120 and/or the automated retraction application 122 maintains operation of the motor 114 to maintain the lighting arrangement 110 in the extended state.

When the current aircraft speed is above the lower retraction threshold speed, the autoretraction process 200 verifies or otherwise confirms that the illumination element(s) of the retractable lighting arrangement are turned off or otherwise deactivated (task 206). In this manner, the control system 120 and/or the automated retraction application 122 effectively confirms that the pilot or other aircraft operator is unlikely to be utilizing the retractable lighting arrangement 110 by verifying the pilot or other aircraft operator has deactivated or otherwise turned off the illumination element(s) 112. For example, in scenarios where the aircraft 104 includes separate user interfaces 108 for extending/retracting the lighting arrangement 110 and activating/deactivating the illumination element(s) 112, the pilot or other aircraft operator may deactivate or turn off the illumination element(s) 112 while inadvertently maintaining the lighting arrangement 110 extended. Thus, the autoretraction process 200 is capable of identifying or otherwise confirming the possibility of this scenario before proceeding with automatically retracting the lighting arrangement 110. In this regard, when the illumination element(s) 112 are activated, turned on, or otherwise enabled, the control system 120 and/or the automated retraction application 122 may determine that it is possible that the pilot is utilizing the lighting arrangement 110 even though the current aircraft speed exceeds the lower retraction threshold speed and maintains the lighting arrangement 110 in the extended state.

When the current aircraft speed is above the lower retraction threshold speed and the illumination element(s) are deactivated, the autoretraction process 200 initiates a timer or similar feature to wait for at least a monitoring threshold duration is exceeded before automatically retracting the lighting arrangement (tasks 208, 210). The monitoring threshold duration ensures that the aircraft speed is steadily maintained above the lower retraction threshold speed and that the illumination element(s) are maintained deactivated to accommodate transient fluctuations in the aircraft speed or intermittent operation of the illumination element(s) by the pilot or other operator (e.g., where the illumination element(s) are temporarily turned off while the pilot repositions the aircraft 104). In this regard, the loop defined by tasks 202, 204, 206 and 208 may repeat until the monitoring threshold duration is exceeded. During the monitoring period, if the current aircraft speed falls below the lower retraction threshold speed and/or the illumination element(s) is reactivated, the monitoring timer resets and the autoretraction process 200 maintains the lighting arrangement 110 in the extended state until the conditions for autoretraction are satisfied. After verifying that the aircraft speed has been maintained above the lower retraction threshold speed and that the illumination element(s) have been maintained deactivated for the monitoring threshold duration, the control system 120 and/or the automated retraction application 122 automatically commands, signals, or otherwise instructs the motor 114 or other actuation arrangement associated with the retractable lighting arrangement 110 to transition the lighting arrangement 110 from the extended state to the retracted state. By automatically retracting the lighting arrangement 110 when it is not in use, the reliability and longevity of the lighting arrangement 110 is improved (e.g., by limiting exposure to drag forces or other environmental stressors) while also improving the fuel efficiency of the aircraft 104 (e.g., by reducing drag).

Still referring to FIG. 2, in exemplary embodiments, the autoretraction process 200 is also configured to automatically initiate retraction of the lighting arrangement when the aircraft speed is maintained above an upper retraction speed threshold independent of whether the illumination element(s) are activated (task 212). The upper retraction speed threshold protects the retractable lighting arrangement 110 from excessive drag forces and increased risks of foreign object damage due to higher speed operation. Similar to the lower retraction speed threshold, the upper retraction speed threshold may be configurable by the pilot or other user, and in some embodiments, by default may be set to a value corresponding to a maximum safe operating speed for the retractable lighting arrangement 110 in the extended state that may be designated by the manufacturer of the retractable lighting arrangement 110, the manufacturer of the aircraft 104, the aircraft operator or airline, or another regulatory authority. Similar to the lower retraction speed threshold, the autoretraction process 200 initiates a timer or similar feature to wait for at least a monitoring threshold duration is exceeded to verify the aircraft speed is maintained above the upper retraction speed threshold before automatically retracting the lighting arrangement (tasks 208, 210).

In exemplary embodiments, after automatically retracting the lighting arrangement when the illumination element(s) are activated or otherwise turned on, the autoretraction process 200 initiates a timer or similar feature to wait for at least a deactivation threshold duration is exceeded before automatically deactivating the illumination element(s) (tasks 214, 216). When the illumination element(s) 112 are activated while the lighting arrangement 110 is stowed or otherwise in the retracted state, the illumination element(s) 112 and/or other components of the lighting arrangement 110 may be subjected to increased thermal stress. Additionally, in embodiments where the illumination element(s) 112 consume power from a battery, unintentionally discharging energy while the illumination element(s) 112 are stowed increases the likelihood of unavailability of the illumination element(s) 112 due to unintentional discharge of the battery. Accordingly, the autoretraction process 200 waits for the deactivation threshold duration to ensure that the pilot or other operator does not need to quickly reuse the retractable lighting arrangement 110 before automatically signaling, commanding, or otherwise instructing the retractable lighting arrangement 110 and/or the illumination element(s) 112 to turn off the retractable lighting arrangement 110 and transition the illumination element(s) 112 to a deactivated state. This improves reliability of the searchlight by limiting unintentional thermal stresses and facilitates safer operation by reducing the likelihood of unintentional battery discharge.

It should be noted that in some embodiments, the autoretraction process 200 may be configurable to automatically detect when the lighting arrangement transitions from an extended state to a retracted state and thereafter wait for at least a deactivation threshold duration is exceeded before automatically deactivating the illumination element(s) (e.g., tasks 214, 216) independently of the preceding steps of the autoretraction process 200 (e.g., tasks 202, 204, 206, 208, 210 and 212). For example, in scenarios where there are separate individual switch controls for illumination and actuation independently of one another, a pilot may retract the lighting arrangement 110 but unintentionally forget to turn off the illumination element(s) 112. Thus, when the autonomous operating mode is enabled, the control system 120 and/or the automated retraction application 122 may automatically detect the lighting arrangement 110 being retracted (e.g., based on the measured rotor position data) and thereafter monitor the state of the illumination element(s) 112 and automatically deactivate the illumination element(s) 112 once the deactivation threshold duration of time elapses after the lighting arrangement 110 entering the retracted state.

To briefly summarize, the autoretraction process 200 solves the problems of searchlight or landing light operations where there are separate individual switch controls for illumination and actuation independently of one another. For example, a pilot may turn off the illumination after performing a search but unintentionally leave the searchlight extended on the return phase of the search and rescue operation when the aircraft 104 is traveling at a relatively higher speed than during the search phase of the search and rescue operation. By virtue of the autoretraction process 200, the searchlight may be automatically retracted once the aircraft speed is indicative of the search phase being completed, thereby improving the reliability of the searchlight and improving the efficiency and safety of the return phase. Moreover, in scenarios where the pilot or other operator forgets to deactivate the illumination element(s) 112, the autoretraction process 200 automatically deactivates the illumination element(s) 112 after autoretraction to decrease thermal stresses and energy consumption, thereby improving the longevity and/or reliability of the searchlight. At the same time, the autoretraction process 200 verifies that the searchlight is no longer still in use or is otherwise unlikely to be in use, such that the autoretraction process 200 does not interfere with situational awareness during usage of the searchlight. Additionally, by alleviating the mental and manual burdens of manually deactivating and stowing the searchlight, the pilot's situational awareness and time devoted to other tasks may be increased without impairing future operation of the searchlight by virtue of the autonomous operating mode.

For the sake of brevity, conventional techniques related to avionics systems, aircraft lighting systems, user interfaces, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of operating a lighting arrangement associated with a vehicle, the method comprising:
obtaining a current speed of the vehicle when the lighting arrangement is in an extended state; and
when the current speed is greater than a threshold when the lighting arrangement is in the extended state:
verifying one or more illumination elements associated with the lighting arrangement are in a deactivated state; and
after verifying the one or more illumination elements are in the deactivated state, automatically signaling an actuation arrangement associated with the lighting arrangement to transition the lighting arrangement from the extended state to a retracted state.

2. The method of claim 1, further comprising automatically signaling the actuation arrangement associated with the lighting arrangement to transition the lighting arrangement from the extended state to the retracted state when the current speed is greater than a second threshold, wherein the second threshold is greater than the threshold.

3. The method of claim 2, further comprising automatically signaling the one or more illumination elements to the deactivated state after automatically signaling the actuation arrangement associated with the lighting arrangement to transition the lighting arrangement from the extended state to the retracted state.

4. The method of claim 3, further comprising verifying a speed of the vehicle is greater than the second threshold for at least a third threshold duration of time prior to automatically signaling the actuation arrangement associated with the lighting arrangement to transition the lighting arrangement from the extended state to the retracted state.

5. The method of claim 4, further comprising verifying the lighting arrangement is maintained in the retracted state for at least a fourth threshold duration of time prior to automatically signaling the one or more illumination elements to the deactivated state.

6. The method of claim 2, further comprising verifying a speed of the vehicle is greater than the second threshold for at least a third threshold duration of time prior to automatically signaling the actuation arrangement associated with the lighting arrangement to transition the lighting arrangement from the extended state to the retracted state.

7. The method of claim 1, further comprising verifying a speed of the vehicle is greater than the threshold for at least a second threshold duration of time prior to automatically signaling the actuation arrangement associated with the lighting arrangement to transition the lighting arrangement from the extended state to the retracted state.

8. The method of claim 1, wherein obtaining the current speed comprises:
    obtaining a current measurement from a current sensor associated with the actuation arrangement; and
    estimating the current speed of the vehicle based at least in part on the current measurement.

9. The method of claim 1, wherein obtaining the current speed comprises:
    obtaining acceleration measurement data associated with the vehicle; and
    calculating the current speed of the vehicle based at least in part on the acceleration measurement data.

10. The method of claim 9, wherein obtaining the acceleration measurement data comprises obtaining the acceleration measurement data from an acceleration sensing arrangement embedded with a lighting system including the lighting arrangement.

11. The method of claim 1, wherein obtaining the current speed comprises:
    obtaining position measurement data associated with the vehicle; and
    calculating the current speed of the vehicle based at least in part on the position measurement data.

12. The method of claim 11, wherein obtaining the position measurement data comprises obtaining the position measurement data from a position sensing arrangement embedded with a lighting system including the lighting arrangement.

13. A lighting system comprising:
    a retractable lighting arrangement including one or more illumination elements;
    an actuation arrangement coupled to the retractable lighting arrangement; and
    a control system coupled to the actuation arrangement and the retractable lighting arrangement, wherein the control system is configured to identify when a current vehicle speed is greater than a retraction threshold speed when the retractable lighting arrangement is in an extended state and thereafter verify the one or more illumination elements associated with the retractable lighting arrangement are in a deactivated state prior to automatically signaling the actuation arrangement to transition the retractable lighting arrangement from the extended state to a retracted state.

14. The lighting system of claim 13, further comprising a sensing arrangement to provide measurement data associated with a vehicle, wherein the control system is configured to calculate the current vehicle speed based at least in part on the measurement data.

15. The lighting system of claim 14, wherein the sensing arrangement comprises an acceleration sensing arrangement to provide acceleration measurement data associated with the vehicle.

16. The lighting system of claim 14, wherein the sensing arrangement comprises a position sensing arrangement to provide position measurement data associated with the vehicle.

17. The lighting system of claim 14, wherein the sensing arrangement, the actuation arrangement, the retractable lighting arrangement and the control system are contained within a common housing associated with the lighting system.

18. The lighting system of claim 13, further comprising a current sensing arrangement to provide measurement data indicative of an electrical current flow to the actuation arrangement, wherein the control system is configured to calculate the current vehicle speed based at least in part on the measurement data.

19. A non-transitory computer-readable medium having computer-executable instructions stored thereon that, when executed by a processing system, cause the processing system to:
    obtain a current speed of a vehicle when a lighting arrangement is in an extended state; and
    when the current speed is greater than a threshold when the lighting arrangement is in the extended state:
        verify one or more illumination elements associated with the lighting arrangement are in a deactivated state; and
        after verifying the one or more illumination elements are in the deactivated state, automatically signal an actuation arrangement associated with the lighting arrangement to transition the lighting arrangement from the extended state to a retracted state.

20. The non-transitory computer-readable medium of claim 19, wherein the computer-executable instructions cause the processing system to automatically signal the actuation arrangement associated with the lighting arrangement to transition the lighting arrangement from the extended state to the retracted state when the current speed is greater than a second threshold, wherein the second threshold is greater than the threshold.

* * * * *